United States Patent [19]
Makino

[11] Patent Number: 5,153,800
[45] Date of Patent: Oct. 6, 1992

[54] TAPE CASSETTE HAVING FRONT SURFACES TO GUIDE A TAPE ACCOMMODATED THEREIN

[75] Inventor: Masahiro Makino, Miyagi, Japan

[73] Assignee: Sony Corporation, Tokyo, Japan

[21] Appl. No.: 625,554

[22] Filed: Dec. 11, 1990

[30] Foreign Application Priority Data

Dec. 15, 1989 [JP] Japan .................................. 1-324999

[51] Int. Cl.⁵ ............................................ G11B 23/02
[52] U.S. Cl. ..................................... 360/132; 242/199
[58] Field of Search .................. 360/132; 242/197–201

[56] References Cited

U.S. PATENT DOCUMENTS

| | | | |
|---|---|---|---|
| 4,748,529 | 5/1988 | Shiba et al. | 360/132 |
| 4,754,357 | 6/1988 | Nelson | 360/132 |
| 4,766,511 | 8/1988 | Miyoshi et al. | 360/132 |
| 4,884,159 | 11/1989 | Satoh | 360/132 |
| 5,003,425 | 3/1991 | Ozawa | 360/132 |

FOREIGN PATENT DOCUMENTS

| | | |
|---|---|---|
| 3511227A1 | 10/1985 | Fed. Rep. of Germany . |
| 3618498A1 | 4/1986 | Fed. Rep. of Germany . |
| 2176170B | 11/1988 | United Kingdom . |

Primary Examiner—David J. Severin
Attorney, Agent, or Firm—Philip M. Shaw, Jr.

[57] ABSTRACT

A tape cassette arranged such that coarse surface areas are formed on guide surfaces used to guide a magnetic tape along the external surface of the front side wall portion formed inside of a cassette lid and that the coarse surface areas are gradually reduced toward the seam 19 of upper and lower parts. Thus, when the upper and lower parts are molded, the upper and lower parts can be removed from the metal molds with ease. Also, electrification can be prevented from occurring in the magnetic tape or in the upper and lower parts when the magnetic tape is transported along the guide surfaces.

5 Claims, 4 Drawing Sheets

TAPE CASSETTE HAVING FRONT SURFACES TO GUIDE A TAPE ACCOMMODATED THEREIN

BACKGROUND OF THE INVENTION

1. Field of the Invention

The present invention generally relates to tape cassettes and, more particularly, to a tape cassette in which a pair of tape reels are aligned within a cassette casing and a magnetic tape is attached at each end to a different one of the reels and is wrapped about one or both of them.

2. Description of the Prior Art

Such tape cassettes are now widely available as a record medium for a video tape recorder (VTR) and are described in Japanese Utility Model Laid-Open Gazette No. 63-153383. When this tape cassette is loaded on a video tape recorder, the magnetic tape accommodated within the cassette casing is pulled out and wrapped around a rotary head drum. Then, a rotary head obliquely scans this magnetic tape to perform predetermined recording and/or reproduction.

In a tape cassette of the so-called VHS type, in a fast forward mode and in a rewind mode, a magnetic tape is withdrawn into the cassette casing and the magnetic tape is transported in such a manner as to reduce the resistance exerted upon the magnetic tape. In the fast forward mode or in the rewind mode, it is to be noted that the magnetic tape is transported at high speed in the forward direction or in the reverse direction along a guide surface formed on the outer surfaces of the front side wall portions of the cassette casing. Accordingly, it is frequently observed that, when the magnetic tape is slidably transported along the guide surface of the cassette casing, electrification occurs in the magnetic tape to cause the magnetic tape to be stuck to the guide surface of the cassette casing.

To solve this problem of the prior art, it is proposed to avoid electrification generated on the magnetic tape by forming very small concave and convex portions on the surface of the guide surface. Japanese Utility Model Laid-Open Gazette No. 63-153383 describes such previously-proposed tape cassette. However, this type of tape cassette has the disadvantage that, if very small concave and convex portions are formed over the entire surface of the guide surface, when the upper and lower shells or parts forming the cassette casing are removed from metal molds after the molding-process, the resistance in the removal-process increases considerably, thus making it impossible to remove the molded products from the metal molds.

OBJECTS AND SUMMARY OF THE INVENTION

Accordingly, it is an object of the present invention to provide an improved tape cassette which can eliminate the aforementioned shortcomings and disadvantages encountered with the prior art.

More specifically, it is an object of the present invention to provide a tape cassette in which electrification can be prevented from occurring in the magnetic tape.

It is another object of the present invention to provide a tape cassette in which the upper and lower parts can be removed from metal molds with ease.

One aspect of the present invention resides in an improvement, in a tape cassette of the type in which a pair of tape reels are aligned within a cassette casing and a magnetic tape is wrapped around the pair of tape reels with each end of the tape being attached to a different one of the tape reels, the tape cassette is arranged such that a cassette lid is attached to a front surface side of the cassette casing so as to become openable and closable, a guide surface is formed on the front surface side of the cassette casing so as to oppose the inside of the cassette lid, and the magnetic tape is extended along the surface of the guide surface. The improvement according to the invention resides in that a coarse surface area is formed on the guide surface, in which the coarse surface area is gradually reduced in width toward the seam where the upper and lower shells that make up the cassette casing are joined together.

The preceding, and other objects, features and advantages of the present invention will be apparent in the following detailed description of preferred embodiments when read in conjunction with the accompanying drawings, in which like reference numerals are used to identify the same or similar parts in the several views.

DETAILED DESCRIPTION OF THE PREFERRED EMBODIMENT

Figure 1:
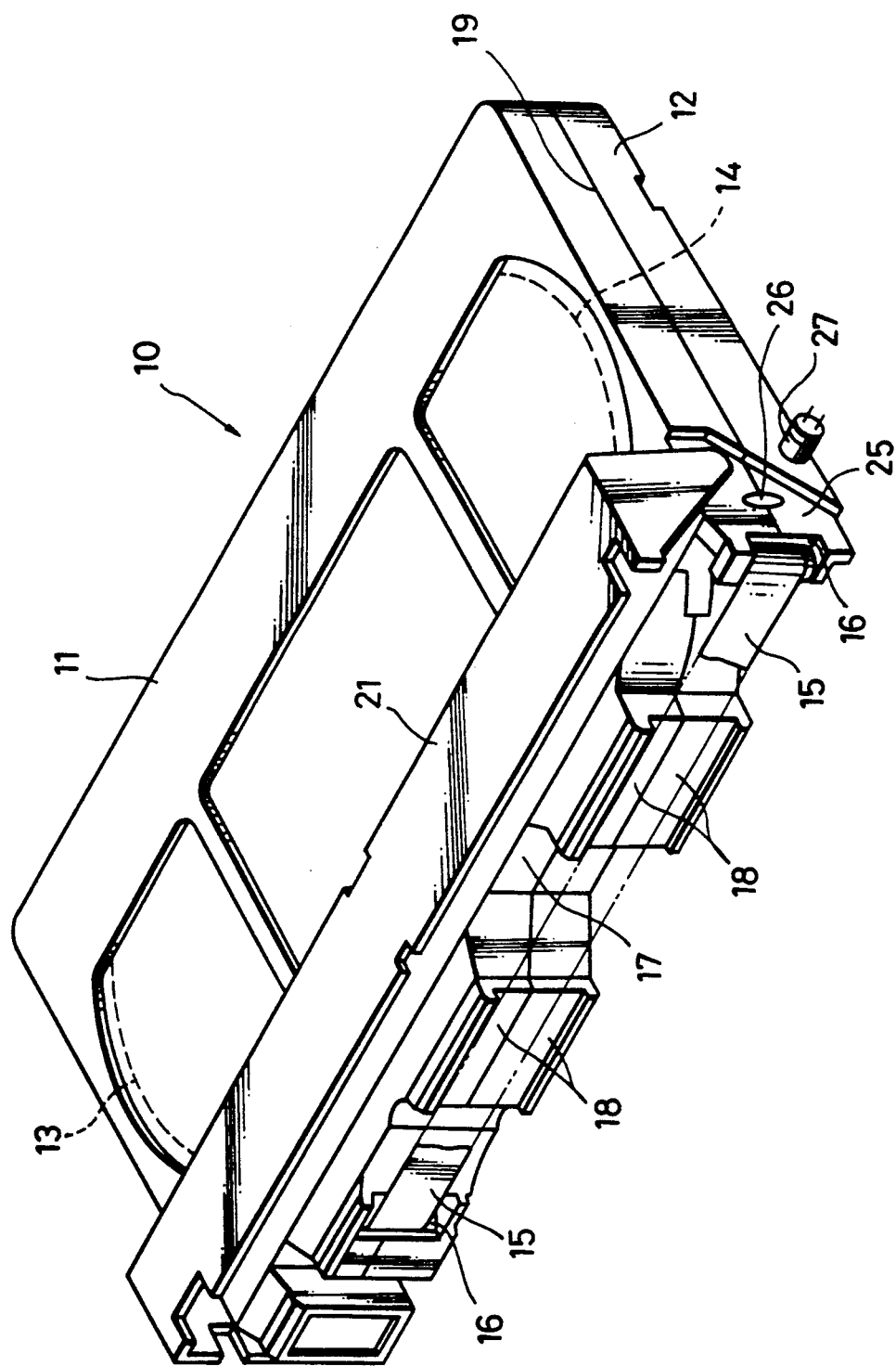
FIG. 1 is a perspective view of the external appearance of an embodiment of a tape cassette according to the present invention with its cassette lid being opened.

Referring to the drawings in detail, and initially to FIGS. 1 and 2, a first embodiment of the tape cassette according to the present invention will be described hereinafter.

Figure 2:
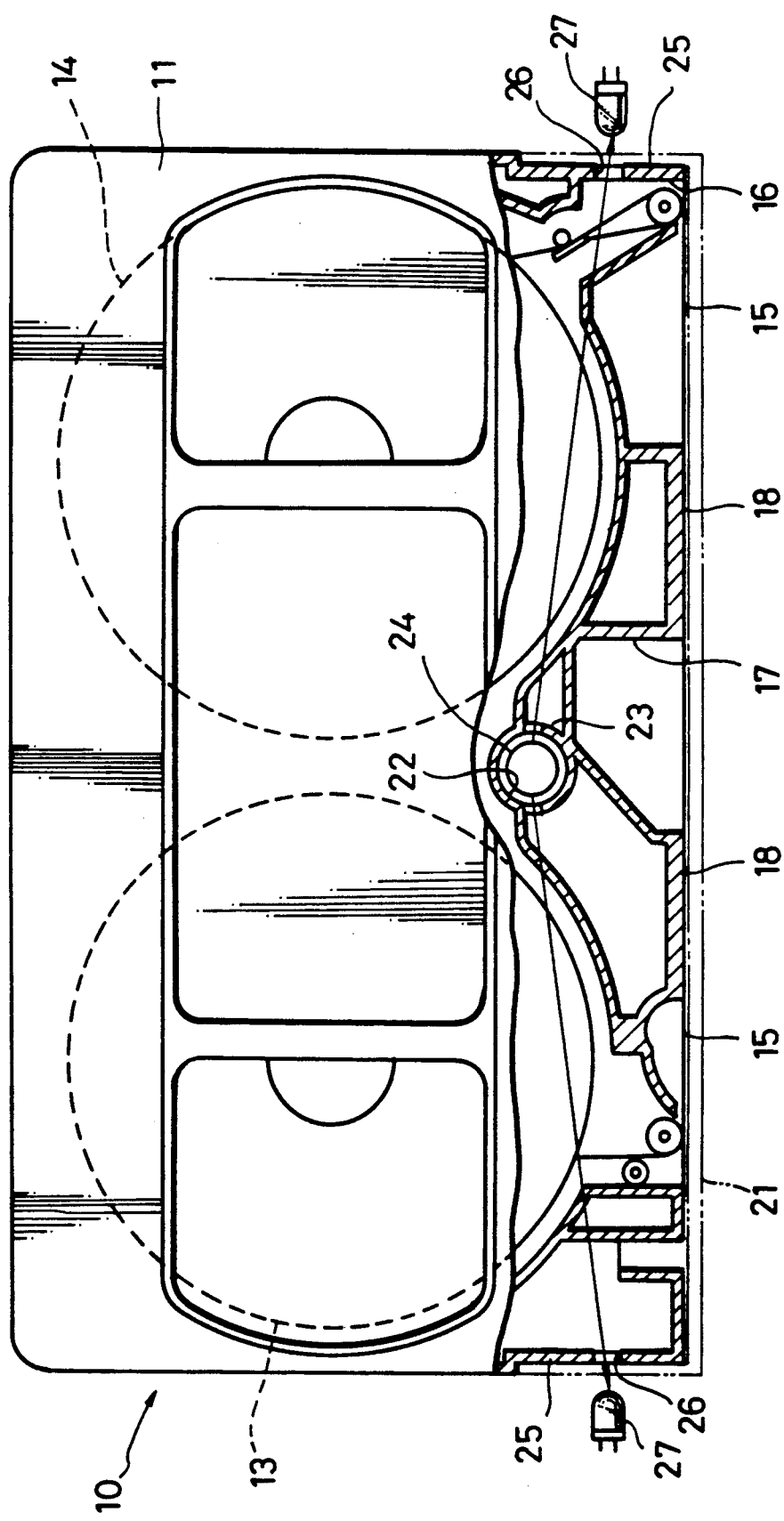
FIG. 2 is a plan view of the tape cassette of FIG. 1 with portions broken away and in section and further showing a tape end detection sensor system of a VTR.

It will be seen in FIGS. 1 and 2 that this tape cassette has a cassette casing 10 which is shaped substantially as a flat rectangular solid. The cassette casing 10 is comprised of a pair of upper and lower shells or parts 11 and 12, respectively. The upper and lower parts 11 and 12 are molded by a synthetic resin molding-process and fastened together by some suitable means such as a bonding-process or the like. A pair of left and right tape reels 13 and 14, respectively, are accommodated within the cassette casing 10 in alignment with each other. A magnetic tape 15 is wrapped around the pair of tape reels 13 and 14 with each end of the tape being attached to a different one of the tape reels 13 and 14. In operation, the magnetic tape 15 is pulled out to the front wall side of the cassette casing 10 through opening portions 16 formed at the left and right sides of the front wall of the cassette casing 10 and extended along guide surfaces 18 formed on the surface of a front side wall portion 17.

An openable and closable front lid 21 is provided at the front side of the front side wall portion 17 having the guide surfaces 18 along which the magnetic tape 15 is extended. As shown in FIG. 2, a circular opening portion 22 is formed through the bottom portion of the cassette casing 10, and a cylindrical-shaped guide portion 23 is elongated within the cassette casing 10 so as to communicate with the circular opening portion 22. When the cassette casing 10 is loaded on a video tape recorder (not shown), a lamp 24 is relatively inserted into the cylindrical-shaped guide portion 23 as shown in FIG. 2. A small aperture 26 in each side wall 5 of the cassette casing 10 allows separate light receiving elements 27 provided outside of each of the small apertures 26 to sense the tape ends in a manner known per se to those skilled in the art.

The guide surface 18 of the front side wall portion 17 and along which the magnetic tape 15 is extended will be described next with reference to FIGS. 3 and 4.

Figure 3:
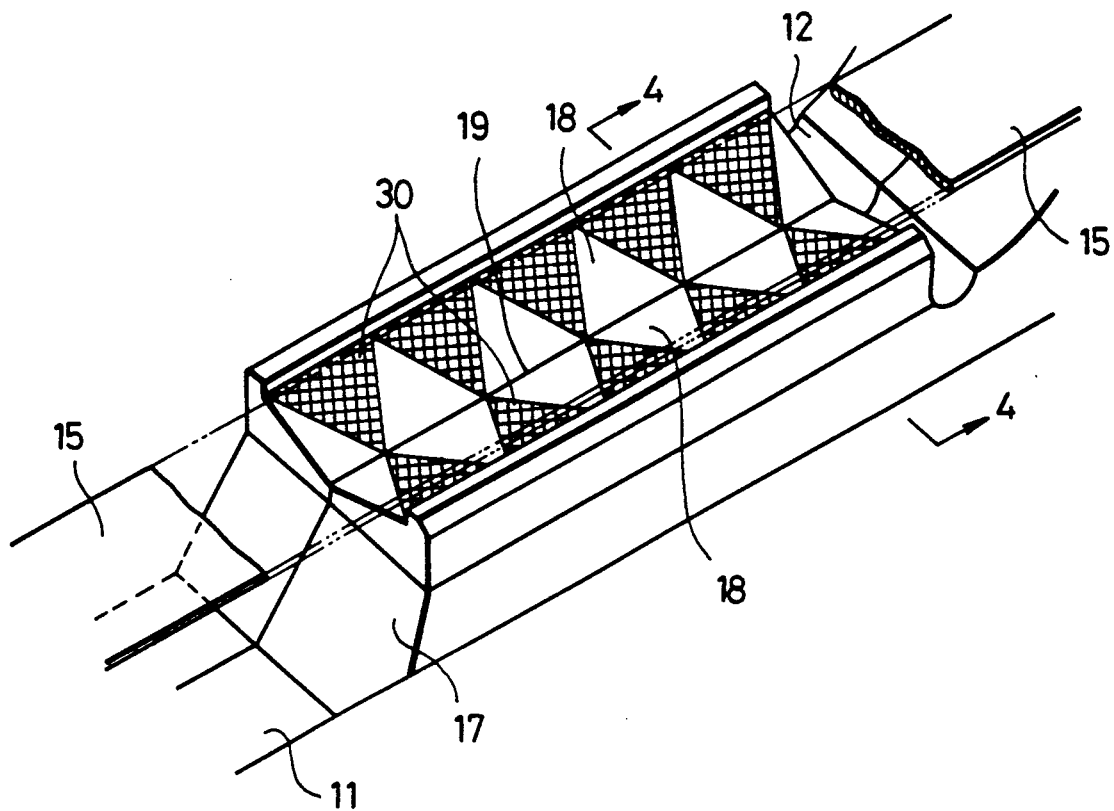
FIG. 3 is an enlarged view illustrating a tape guide surface formed at a front side of the tape cassette according to the embodiment of the present invention.
Figure 4:
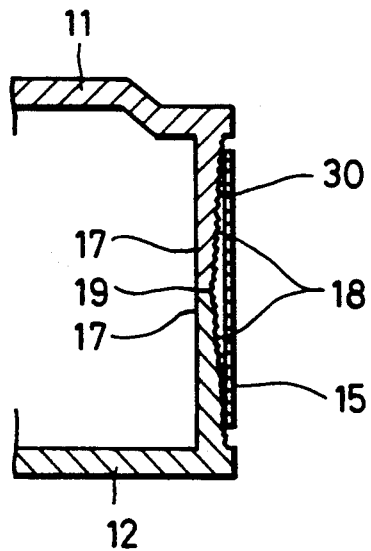
FIG. 4 is a longitudinal cross-sectional view taken generally along the lines 4—4 in FIG. 3.

As shown in FIGS. 3 and 4, a plurality of triangular coarse surface areas 30 are formed on the guide surfaces 18. Each coarse surface area 30 is shaped as a triangle such that its triangular area is gradually reduced toward the seam 19 where the upper and lower parts 11 and 12 are bonded together. The magnetic tape 15 is transported along the guide surface 18 having the coarse surfaces 30 as shown in FIG. 4. The coarse surface 30 corresponds to the surface of the metal mold from which the upper and lower parts 11 and 12 are molded and which is obtained by forming concave and convex portions on the surface of the metal mold by treatment with chemicals. That is, when the upper and lower parts 11 and 12 are formed on the corresponding surfaces by metal molds having concave and convex portions, the coarse surfaces 30 are formed. In addition, as shown in FIG. 4, the guide surface 18 on which the coarse surface 30 is formed is formed as a gently inclined surface and its depth becomes largest at the seam 19 of the upper and lower parts 11 and 12.

In the above-described arrangement, when the tape cassette shown in FIGS. 1 and 2 is loaded onto the video tape recorder (not shown), the cassette lid 21 is opened as shown in FIG. 1, whereby the magnetic tape 15 extended over the guide surfaces 18 of the front side wall portion 17 is exposed to the outside. This magnetic tape 15 is pulled out by a tape pulling pin (not shown) of the video tape recorder and is wrapped around the rotary head drum (not shown) of the video tape recorder in a manner known per se to those skilled in the art. Then, the magnetic head mounted on the rotary head drum is rotated at high speed and the magnetic tape 15 is urged against a capstan by a pinch roller (not shown) and transported at constant speed, thus the predetermined recording and/or reproduction being performed. That is, in the recording mode or in the reproduction mode, the magnetic tape 15 is pulled out from the cassette casing and wound around the head drum of the video tape recorder.

On the other hand, in the fast forward mode or in the rewind mode, as shown in FIGS. 1 and 2, the magnetic tape 15 is transported directly along the guide surfaces 18 of the front side wall portion 17. The reason for this is to reduce the resistance applied to the magnetic tape 15 in order to move the magnetic tape 15 at high speed. In the fast forward mode or in the rewind-mode, the magnetic tape 15 is supplied from one tape reel, transported along the guide surfaces 18 of the front side wall portion 17, and is rewound by the other tape reel at high speed.

To detect the tape ends, they are fixed to the tape reels 13 and 14 via transparent leader tapes so that, when the magnetic tape 15 is thoroughly rewound by the other tape reel, the light from the lamp 24 is sensed by one of the light receiving elements 27 by way of the transparent leader tape, thereby detecting the tape end. When the tape end is detected as described above, the driving of the tape reels 13 and 14 is stopped simultaneously in a manner known per se by those skilled in the art.

As mentioned above, in the fast forward mode or in the rewind mode, if the guide surfaces 18 are flat, electrification tends to occur in the magnetic tape 15 or in the upper and lower parts 11 and 12. There is then the substantial possibility that the magnetic tape 15 will stick to the guide surfaces 18. However, in the cassette according to the present invention, the triangular coarse surface areas 30 are formed on the guide surfaces 18 of the upper and lower parts 11 and 12, and the points of the triangular coarse surface areas 30 are brought in contact with each other at the seam 19 of the upper and lower parts 11 and 12.

In the tape cassette of this embodiment, the guide surfaces 18 of the front side wall portion 17 are gently inclined inwardly toward the seam 19 of the upper and lower parts 11 and 12 shown in FIG. 2, and the triangular coarse surface areas 30 are successively formed on the guide surface portions 18. Therefore, according to the thus arranged guide surface, electrification in the magnetic tape 15 or in the upper and lower parts 11 and 12 is reduced, and the magnetic tape 15 is prevented from being stuck to the guide surfaces 18.

Since the coarse surface areas 30 are gradually reduced in width toward the seam 19 of the upper and lower parts 11 and 12, it becomes possible to considerably reduce the resistance of the guide surfaces 18 when the upper and lower parts 11 and 12 are removed from the metal molds as compared with the case in which the entire surface is made coarse. Accordingly, it is possible to obtain a tape cassette in which the magnetic tape 15 can be prevented from being stuck to the guide surfaces 18 and also the upper and lower parts 11 and 12 can be easily removed from the metal molds.

Figure 5:
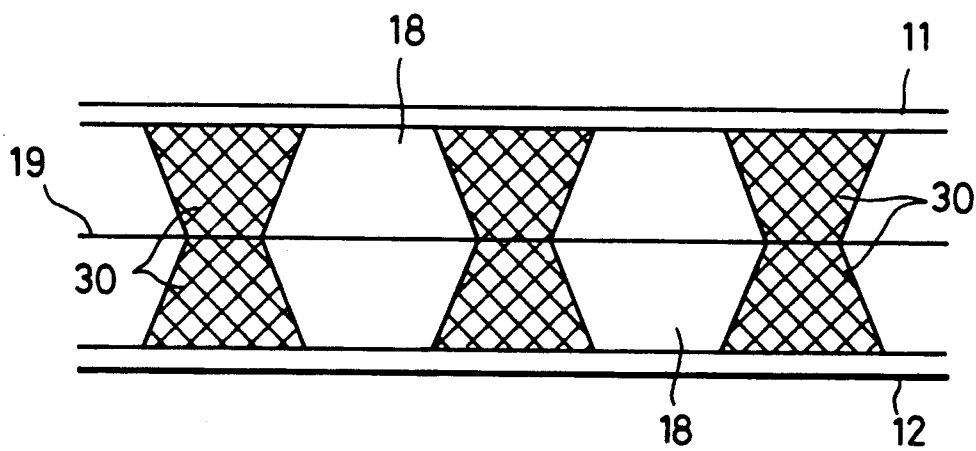
FIG. 5 is an enlarged front view of a modified example of tape guide surface of the present invention.
Figure 6:
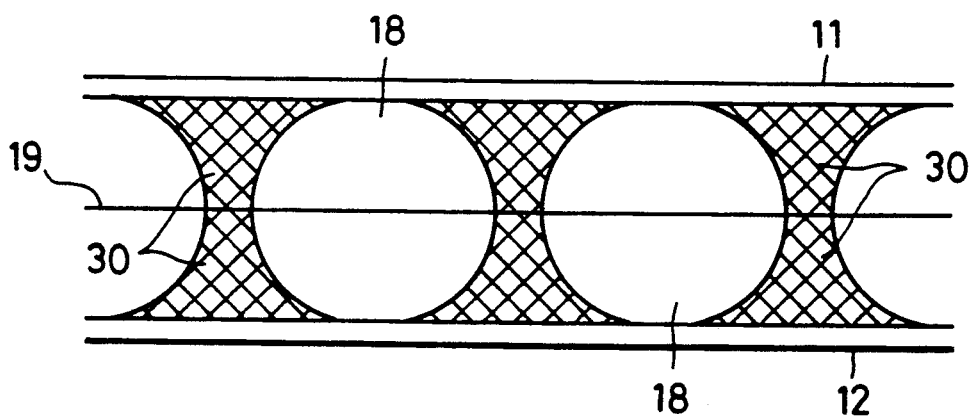
FIG. 6 is an enlarged front view of a further modified example of tape guide surface of the present invention.
Figure 7:
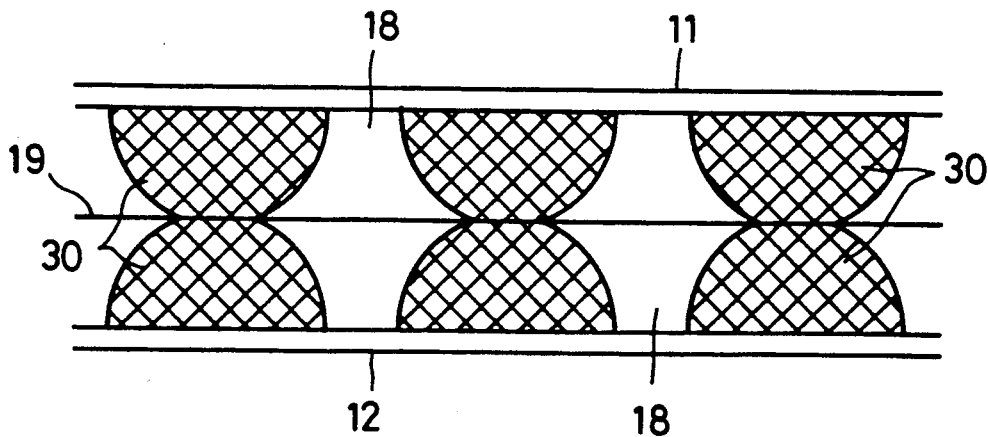
FIG. 7 is an enlarged front view of a further modified example of tape guide surface of the present invention.

The shape of the coarse surface area 30 formed on the guide surface 18 of the front side wall portion 17 is not limited to that of FIG. 3 and may be a trapezoidal-shape as shown in FIG. 5. Also in this case, the width of the trapezoidal-shaped coarse surface area is reduced toward the seam 19 of the upper and lower parts 11 and 12. Further, two sides of a triangular shape may be curved in an arc-fashion as shown in FIG. 6. Furthermore, as shown in FIG. 7, the coarse surface areas 30 may be shaped substantially as semicircles and their upper and lower semicircular portions may be contacted to each other at the seam 19 of the upper and lower parts 11 and 12.

As described above, according to the present invention, the coarse surface areas are formed on the guide surfaces of the front side of the cassette casing and which are inside of the cassette lid, and each of the coarse surface areas is gradually reduced in width near the seam 19 of the upper and lower parts. Therefore, according to the coarse surface areas, it becomes possible to effectively prevent electrification from occurring in the magnetic tape or in the upper and lower parts when the magnetic tape is slidably transported along the guide surfaces of the upper and lower parts. In addition, since the width of each of the coarse surface areas is gradually reduced near the seam 19 of the upper and lower parts, increased resistance of the coarsened guide surfaces when the upper and lower parts are removed from the metal molds can be avoided.

Having described preferred embodiments of the invention with reference to the accompanying drawings, it is to be understood that the invention is not limited to those precise embodiments and that various changes and modifications thereof could be effected by one skilled in the art without departing from the spirit or scope of the novel concepts of the invention as defined in the appended claims.

I claim:

1. In a tape cassette having a cassette casing with a front surface side and made up of an upper part and a lower part which are bonded together along a seam, and in which a pair of tape reels are aligned, and a magnetic tape is wrapped around the pair of tape reels with each end of the tape being fixed to a different one of the tape reels, the magnetic tape and the tape reels being accommodated in the cassette casing, the tape cassette being characterized in that:

a cassette lid is attached to the front surface side of the cassette casing so as to become openable and closable;

a guide surface is formed on the front surface side of the cassette casing so as to oppose the inside of the cassette lid;

the magnetic tape is extended along the surface of the guide surface; and a coarse surface area is formed on the guide surface, the coarse surface area having concave and convex portions, wherein the coarse surface area is gradually reduced in width toward the seam between the upper and lower parts.

2. The cassette according to claim 1, in which the guide surface is inclined toward the inside of the cassette casing at the seam of the upper and lower parts.

3. The tape cassette according to claim 1, in which the coarse surface areas are shaped as semicircles which are contacted with each other at the seam.

4. The tape cassette according to claim 1, in which the coarse surface area is shaped as a triangle whose area is gradually reduced toward the seam of the upper and lower parts.

5. The tape cassette according to claim 4, in which two sides of the triangular coarse surface area are curved as arcs.

* * * * *